(12) United States Patent
Matsui et al.

(10) Patent No.: US 12,184,705 B2
(45) Date of Patent: Dec. 31, 2024

(54) COMMUNICATION SYSTEM, COMMUNICATION METHOD, AND NON-TRANSITORY STORAGE MEDIUM STORING PROGRAM

(71) Applicant: SORACOM, INC., Tokyo (JP)

(72) Inventors: Motokatsu Matsui, Tokyo (JP); Taku Fukushima, Tokyo (JP)

(73) Assignee: SORACOM, INC, Tokyo (JP)

( * ) Notice: Subject to any disclaimer, the term of this patent is extended or adjusted under 35 U.S.C. 154(b) by 0 days.

(21) Appl. No.: 18/153,115

(22) Filed: Jan. 11, 2023

(65) Prior Publication Data

US 2023/0199035 A1 Jun. 22, 2023

Related U.S. Application Data

(63) Continuation of application No. PCT/JP2021/026267, filed on Jul. 13, 2021.

(30) Foreign Application Priority Data

Jul. 13, 2020 (JP) ................................ 2020-120194

(51) Int. Cl.
*H04L 65/1069* (2022.01)
*H04W 48/18* (2009.01)

(52) U.S. Cl.
CPC ......... *H04L 65/1069* (2013.01); *H04W 48/18* (2013.01)

(58) Field of Classification Search
None
See application file for complete search history.

(56) References Cited

U.S. PATENT DOCUMENTS

| | | |
|---|---|---|
| 10,567,245 B1 | 2/2020 | Patil et al. |
| 2008/0155023 A1* | 6/2008 | Kadashevich .......... H04L 69/40 714/57 |
| 2012/0167081 A1* | 6/2012 | Sedayao ................. G06F 11/30 718/1 |
| 2012/0208562 A1 | 8/2012 | Wilkin et al. |
| 2015/0081808 A1* | 3/2015 | Christianto ............. H04L 51/08 709/206 |
| 2019/0174011 A1* | 6/2019 | Jabara ................ H04M 15/8214 |
| 2019/0222965 A1* | 7/2019 | O'Connor ............... H04W 8/18 |
| 2019/0297147 A1* | 9/2019 | Drasin .................. H04L 67/141 |
| 2021/0377033 A1* | 12/2021 | Teran Guajardo .... H04L 9/3236 |

FOREIGN PATENT DOCUMENTS

JP 2014-508469 A 4/2014

* cited by examiner

*Primary Examiner* — Fadi Haj Said
(74) *Attorney, Agent, or Firm* — WC&F IP

(57) ABSTRACT

A communication system including: a cloud facility and a capture server, wherein the capture serve receives session identification information from the cloud facility that receives a session generation request from the communication facility. If a capture function is enabled for the SIM associated with the session identification information, the capture server starts a capture process for capturing a packet whose session identification information included in a header matches session identification information associated with the SIM whose capture function has been enabled, among packets received by mirroring of data transmitted toward the cloud facility, and the cloud facility transmits a response to the session generation request to the communication facility connected to the cloud facility, after the capture process is started.

11 Claims, 4 Drawing Sheets

COMMUNICATION SYSTEM, COMMUNICATION METHOD, AND NON-TRANSITORY STORAGE MEDIUM STORING PROGRAM

CROSS-REFERENCE TO RELATED APPLICATIONS

Background of the Invention

The present application is a continuation application of International Application number PCT/JP2021/026267, filed on Jul. 13, 2021, which claims priority under 35 U.S.C § 119(a) to Japanese Patent Application No. 2020-120194, filed on Jul. 13, 2020, contents of which are incorporated herein by reference in their entirety.

The present invention relates to a communication system, a communication method, and a non-transitory storage medium storing a program for capturing a portion of data.

The number of devices connected to a computer network such as the Internet has increased, and the concept of "Internet of Things", in which every device is networked has increased. While conventionally an MNO (mobile network operator) having a wireless communication infrastructure has directly provided a wireless communication service for networking devices to an end user, recently, an operator called an MVNO (mobile virtual network operator) provides a unique wireless communication service to the end user using the wireless communication infrastructure of the MNO. In some cases, an MVNE (mobile virtual network enabler) is interposed between the MNO and the MVNO to provide support services for smooth business, and the MVNE receives SIM from the MNO and further provides the MVNO with SIM.

The MVNE or MVNO, which provides wireless communication services for networked devices (hereinafter referred to as an "IoT devices"), may have its own communication infrastructure to provide access to computer networks such as IP networks, thereby attempting to set communication quality, such as communication speed, communication capacity, and the like according to price and to meet various needs.

When data is collected from IoT devices in order to expand such services, there is a concern that an unexpected amount of data is transmitted and received or fraudulent communication is performed, and so there can be a situation in which a service user wants to confirm the content of the communication. There is also a situation in which there is a desire to confirm the communication content for the purpose of debugging.

However, a function of simply acquiring communication content by focusing on a specific IoT device among the communications performed by a large number of IoT devices has not been provided by any of MNO, MVNE, and MVNO, as far as the inventors know.

BRIEF SUMMARY OF THE INVENTION

It is an object of the present invention to provide a communication system, a communication method, and a non-transitory storage medium storing a program for providing an IoT device with access to an IP network, wherein data transmitted from a designated IoT device can be easily acquired in response to a request.

In order to achieve such an object, a first aspect of the present invention is characterized by a communication system including: a cloud facility configured to be capable of receiving, via a communication facility of a wireless communication network, data transmitted from an IoT device and transmitting the data to an IP network; a capture server for capturing a portion of the data transmitted from the IoT device toward the cloud facility, wherein the capture server: receives session identification information for identifying a session associated with a SIM installed in the IoT device from the cloud facility that receives a session generation request from the communication facility that received a data communication start request from the IoT device, and determines whether or not a capture function is enabled for the SIM associated with the session identification information; and if the capture function is enabled, starts a capture process for capturing a packet whose session identification information included in a header matches the session identification information associated with the SIM whose capture function has been enabled, among packets received by mirroring of data transmitted toward the cloud facility, and the cloud facility transmits a response to the session generation request to the communication facility connected to the cloud facility, after the capture process is started.

Further, a second aspect of the present invention is characterized by a communication method for capturing a portion of data transmitted from an IoT device via an communication facility of a wireless communication network toward a cloud facility configured to be capable of transmitting data to an IP network, the communication method including: a step in which a capture server communicable with the cloud facility receives session identification information for identifying session associated with a SIM installed in the IoT device from the cloud facility that receives a session generation request from the communication facility that received a data communication start request from the IoT device, and determines whether a capture function is enabled for the SIM associated with the session identification information; a step in which, if the capture function is enabled, the capture server starts a capture process of capturing a packet whose session identification information included in the header matches the session identification information associated with the SIM whose capture function has been enabled, among packets received by mirroring of data transmitted toward the cloud facility; and a step in which the cloud facility transmits a response to the session generation request to the communication facility connected to the cloud facility after the capture process is started.

Further, a third aspect of the present invention is characterized by a non-transitory storage medium storing a program for causing a cloud facility configured to be capable of transmitting data to an IP network and a capture server capable of communicating with the cloud facility to execute a communication method for capturing a portion of data transmitted from an IoT device via a communication facility of a wireless communication network toward the cloud facility, wherein the communication method includes: a step in which the capture server receives session identification information for identifying a session associated with a SIM installed in the IoT device from the cloud facility that receives a session generation request from the communication facility that received a data communication start request from the IoT device, and determines whether capture function is enabled for the SIM associated with the session identification information; a step in which, if the capture function is enabled, the capture server starts a capture process of capturing a packet whose session identification information associated with the SIM whose capture function has been enabled included in the header matches the session identification information, among packets received by mirroring of data transmitted toward the cloud facility and a step in which the cloud facility transmits a response to the session generation request to the communication facility connected to the cloud facility after the capture process is started.

DETAILED DESCRIPTION OF THE EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Figure 1:
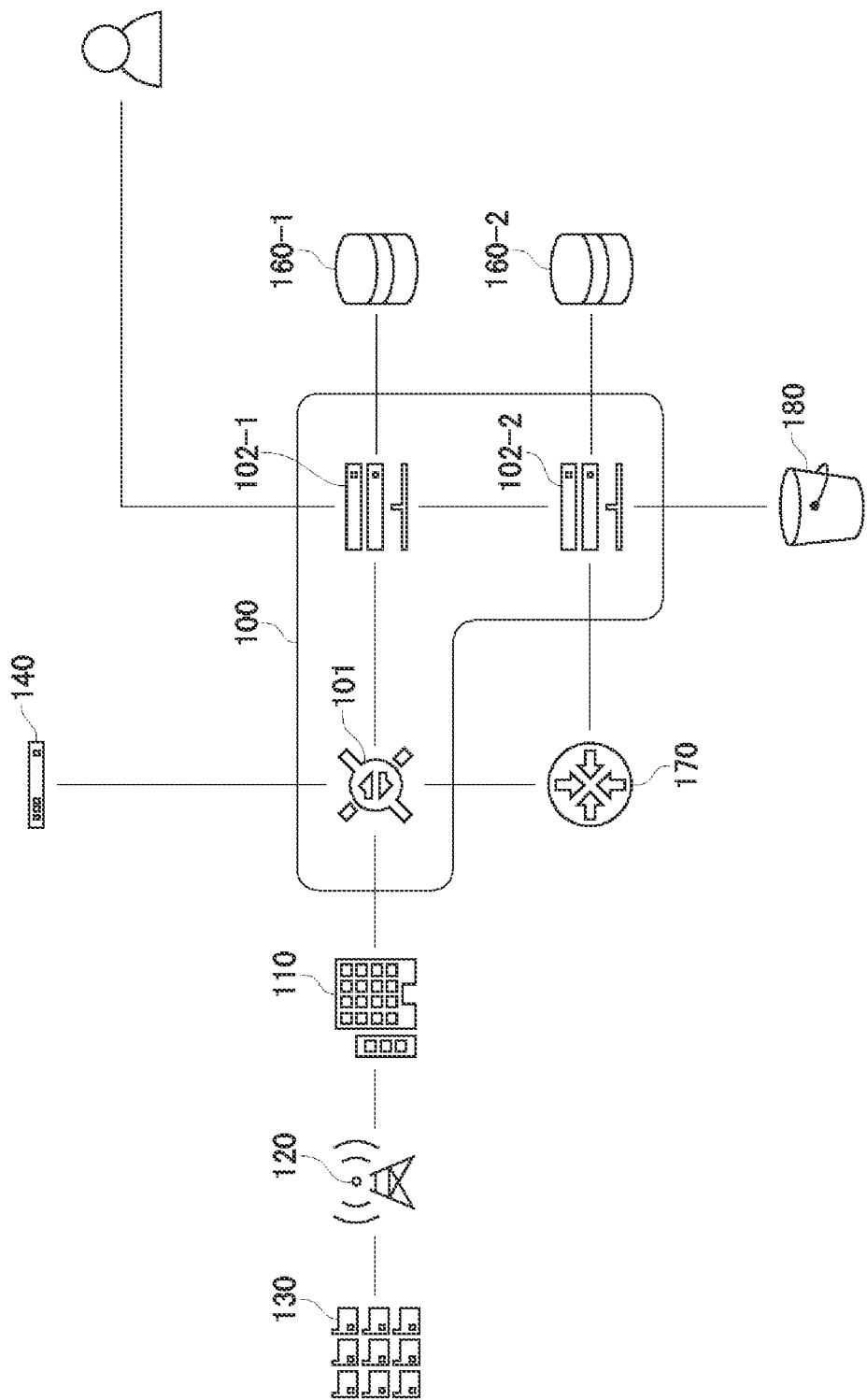
FIG. 1 is a diagram showing a communication system according to an embodiment of the present invention.
Figure 2:
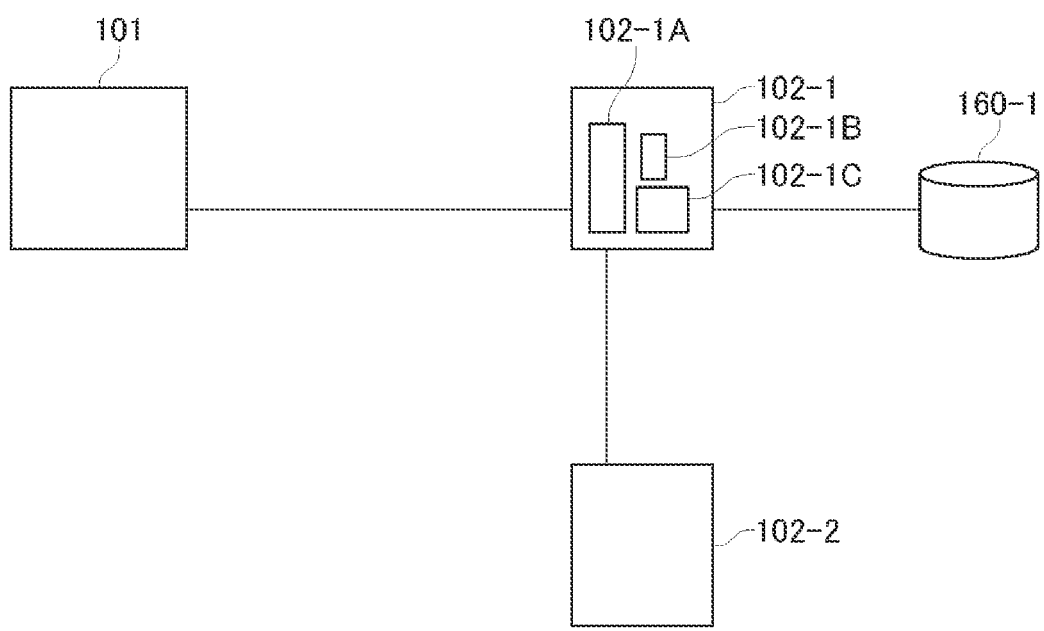
FIG. 2 is a diagram showing a first capture server according to an embodiment of the present invention.

FIG. 1 shows a communication system according to an embodiment of the present invention. The communication system 100 includes a cloud facility 101 configured to receive, via a base station 120 and an MNO facility 110, data transmitted from an IoT device 130 and to transmit the data to an IP network 140, and a capture server 102 for capturing data transmitted from the IoT device 130 toward the cloud facility 101. The MNO facility 110 is an example of a communication facility of a wireless communication facility. The capture server 102 may be separated into a first capture server 102-1 for controlling the start of the capture and a second capture server 102-2 for executing a capture operation, and although the following describes an example in which such separation is used, these capture servers may be a single server. Further, the first capture server 102-1 may be an instance on a cloud, in a similar manner as the cloud facility 101, or may be an instance on a public cloud or the same cloud as the cloud facility 101. The same applies to the second capture server 102-2.

In the present specification, the term "MNO facility" means a facility for communication possessed by the MNO, and the term "cloud facility" means a facility on a cloud. Here, the term "cloud" refers to a system capable of dynamically provisioning and providing computing resources such as a CPU, memory, storage, and network bandwidth on a network according to demand. For example, the cloud can be used through AWS® or the like. The term "public cloud" refers to a cloud that can be used by a plurality of tenants. The cloud facility 101 is a node possessed by the MVNE or MVNO, and is preferably an instance on a public cloud.

The first capture server 102-1 includes a communication part 102-1A such as a communication interface, a processing part 102-1B such as a processor or a CPU, and a storage part 102-1C including a storage device or a storage medium such as a memory or a hard disk, and can be formed by executing a program for performing each process. The first capture server 102-1 may include one or more devices, computers, servers, or instances. The program may include one or more programs, and may be recorded on a computer-readable storage medium to be a non-transitory program product. The program can be stored in a storage device or a storage medium accessible from the storage part 102-1C or the first capture server 102-1, and can be executed by the processing part 102-1B. Although not shown, the cloud facility 101 and the second capture server 102-2 can have the same configuration.

In the case of 4G, the SGW corresponds to the MNO facility 110, and the PGW corresponds to the cloud facility 101. In the case of 5G, there is discussion about the functions on the C-plane and the functions on the U-plane being separated and having the functions on the U-plane aggregated into nodes called UPFs, and although the boundaries between the functions performed in the MNO facility 110 and the functions performed in the cloud facility 101 are not necessarily clear, this point does not have an effect on describing the features of the present invention. Similarly, the fact that the both boundaries for functions on the C-plane are not necessarily clear does not affect describing the features of the present invention. The entirety of the functions shared by the MNO facility 110 and the cloud facility 101 may be referred to as a "core network". Furthermore, eNodeB corresponds to the base station 120 in 4G, and gNodeB corresponds to the base station 120 in 5G.

In one embodiment of the present invention, the capture server 102 starts a capture process, described further below, for data acquired by mirroring based on a request from the cloud facility 101 that has received a session generation request associated with a SIM installed in the IoT device 130. After starting the capture process, the capture server 102 notifies the cloud facility 101 of this fact, and the cloud facility 101 notifies the IoT device 130 that the session generation has been completed, via the MNO facility 110 and the base station 120. Hereinafter, the present embodiment will be described in more detail.

First, the user of the communication service provided by the cloud facility 101 can store, in the first database 160-1, that the capture function is enabled at an appropriate timing for the SIM installed in the IoT device 130 managed by the user. Specifically, in response to the user inputting an instruction to enable the capture function by designating the SIM from a web site provided by the first capture server 102-1, the first capture server 102-1 can store the enablement of the capture function in the first database 160-1. Alternatively, an API endpoint or API server (not shown) that provides an API usable by the user may be provided between the first capture server 102-1 and the user terminal, and the first capture server 102-1 may store the enablement of the capture function in the first database 160-1 in response to the user providing input, using the API, to designate the SIM and enable the capture function. The input by the user may include, in addition to the designation of the SIM, designation of a valid period such as a start date and time, the start date and time and an end date and time, the start date and time and a duration period, or the like. For example, it is conceivable to designate a valid period that continues for a period of 30 seconds, 1 minute, 24 hours, or the like. Further, the input may include designation of a prefix used for a file name of a file including one or more packets captured due to the capture operation. For example, when "test" is designated, the beginning of the file name can be set to "test".

As used in this Specification, various aspects can be thought of as the "SIM", and the "SIM" may be a physical SIM card, but may also be a semiconductor chip (also called an "eSIM") embedded in the IoT device 130, or may be realized by installing software in a secure area within a module of the IoT device 130 and storing an identifier such as IMSI (International Mobile Subscriber Identity) on the software.

When starting communication, the IoT device 130 transmits a connection request to the MNO facility 110 via the base station 120 (S301). In the case of 4G, the MNO facility 110 transmits a session generation request to the cloud facility 101 by communication on the C plane conforming to the GTP protocol (S302). In response to the session generation request, the cloud facility 101 generates a session for communication on the U plane in association with the SIM installed in the IoT device 130 (S303), and returns a response to the session generation request, including a TEID (Tunneling Endpoint ID) for identifying the session, to the MNO facility 110, the TEID being a session identification information. However, in the present invention, before transmitting the response, the cloud facility 101 causes the first capture server 102-1 to determine whether or not to start capture of the data transmitted by the communication on the U plane (S304).

When the cloud facility 101 receives data conforming to the GTP-C protocol in the case of 4G, the cloud facility 101 communicates this data, as necessary, to the first capture server 102-1 in a data format conforming to the design concept of a REST API having a high affinity for software development on the cloud. After receiving a request for determining whether or not to start the capture from the cloud facility 101, the first capture server 102-1 references the first database 160-1 accessible from the first capture server 102-1, based on the TEID included in the request, and determines whether or not the capture function is enabled for the SIM associated with the TEID (S305). If a valid period is designated, it may be further determined whether the transmission date and time of the determination request, the reception date and time of the determination request, or a date and time associated with these dates and time is within the valid period. Although FIG. 1 shows the first database 160-1 as a storage device or a storage medium separate from the first capture server 102-1, the first database 160-1 may be a storage device or a storage medium included in the first capture server 102-1.

If the capture function is not enabled, as described above, the first capture server 102-1 notifies the cloud facility 101 of this fact, and the cloud facility 101 notifies the MNO facility 110 about the completion of the session generation. If the capture function is enabled, the first capture server 102-1 transmits a request, to the second capture server 102-2, to start capture of the data transmitted by communication on the U plane to the cloud facility 101 (S306).

If the capture function is enabled, the first capture server 102-1 may notify the cloud facility 101 of this fact, and the cloud facility 101 may send a capture start request to the second capture server 102-2. Further, it is conceivable to determine whether or not the capture function is enabled in the cloud facility 101, and to have various functions shared between the cloud facility 101 and the first capture server 102-1. Further, it is conceivable that the first capture server 102-1 may be the same instance or a different instance on the same cloud or public cloud as the cloud facility 101. By providing the first capture server 102-1 as a separate server or instance, it is possible to avoid causing direct communication between the cloud facility 101 and a user.

Here, although the first capture server 102-1 and the second capture server 102-2 are described as separate servers, they may be understood as the same capture server 102 without being separated. In this case as well, there is no prohibition against a plurality of devices, computers, servers, or instances. By providing separate servers, the second capture server 102-2 can be positioned as a server that directly or mainly handles highly confidential communication content, and security can be increased without directly exposing the second capture server 102-2 to communication with the user. In addition, in a case where the first capture server 102-1 and the second capture server 102-2 are separate nodes on a cloud or a public cloud, the number of instances of each node can be scaled out independently as necessary. For example, the capture operation executed by the second capture server 102-2 for executing the capture operation may be forked and executed by a plurality of nodes. For example, if the data having the largest data size among the data captured due to the capture operation by these nodes is adopted as a result of the capture operation, data having a low possibility of having a missing portion can be obtained.

The second capture server 102-2 transmits, to the mirroring facility 170, a mirroring start request for data transmitted by the communication on the U plane to the cloud facility 101 (S307). The mirroring facility 170 may copy and forward data transmitted by communications on the U-plane to cloud facility 101, which may be received by second capture server 102-2.

The mirroring facility 170 may be implemented as hardware or software, as long as it has a function of copying and transferring data transmitted to the cloud facility 101 by communication on the U plane before or after the cloud facility 101 receives the data. The cloud facility 101 may also have a plurality of instances for handling the communication on the U-plane, and the mirroring facility 170 may explicitly designate at least some of these instances and mirror the designated instances or may mirror all instances associated with the user. Although the mirroring facility 170 is shown as an external facility of the communication system 100 in FIG. 1, the mirroring facility 170 may be a component of the communication system 100. If the mirroring facility 170 is implemented by software, it may be one or more instances on the same cloud as the capture server 102 or the second capture server 102-2.

After mirroring is initiated, the mirroring facility 170 notifies the second capture server 102-2 that mirroring has been initiated (S308), and in response to this, the second capture server 102-2 starts the process (also referred to hereinafter as the "capture process") of capturing, in the second database 160-2, the packet identified by the TEID included in the capture start request (S309). Mirroring of the cloud facility 101 by the mirroring facility 170 may be started separately in advance, in which case the second capture server 102-2 may start the capture process in response to receiving a start request from the first capture server 102-1. Here, it is conceivable for the "capture process" to be executed by the OS itself, in addition to the case where the "capture process" is executed by a program running on the OS of the second capture server 102-2.

The second capture server 102-2 notifies the first capture server 102-1 that the capture process has been started (S310), and the first capture server 102-1 notifies the cloud facility 101 that the capture process has been started (S311). The cloud facility 101 returns a response to the session generation request to the MNO facility 110 at this stage (S312). The response includes a TEID. The MNO facility 110 transmits a response to the connection request to the IoT device 130 (S313), thereby enabling communication on the U plane.

As described above, the communication system 100 according to the embodiment of the present invention receives the session generation request from the MNO facility 110 in response to the connection request from the IoT device 130 and, if the capture function for the SIM is enabled in the process of generating the session associated with the SIM installed in the IoT device 130, starts the capture process for the packet identified by the TEID of the session, and then, by returning a response to the session generation request to the MNO facility 110 to enable communication on the U plane, the user can acquire data on the U plane, which is generated thereafter on a session basis for a designated SIM, by enabling the capture function for the necessary SIM.

The second capture server 102-2 that has started the capture process preferably stores a node identifier, such as an IP address of the second capture server 102-2, in a storage medium or storage device accessible from the first database 160-1, the second database 160-2, the first capture server 102-1, or another second capture server 102-2, in association with a session identifier such as a TEID that identifies the session that has started the capture process. This association preferably further includes the date and time when the capture process was started. If the second capture server 102-2 is an instance on the cloud, the nature of the cloud makes it impossible to deny the possibility of some kind of failure occurring in the operation of the instance. Depending on the specifications of the cloud, when a fault occurs, a new instance is activated taking over the same node identifier. After being activated, the second capture server 102-2 references the association between the one or more session identifiers mentioned above and the node identifier of the node that has started the capture process for each session identifier, thereby determining that there is a capture operation executed by the nodes identified by the node identifiers, and making it possible to resume the capture process for the sessions identified by the session identifiers associated with the node identifiers. In this association, it is preferable to assign a flag indicating that the resumption has been performed, and it is also preferable to further include the date and time when the resumption was performed.

Figure 3:
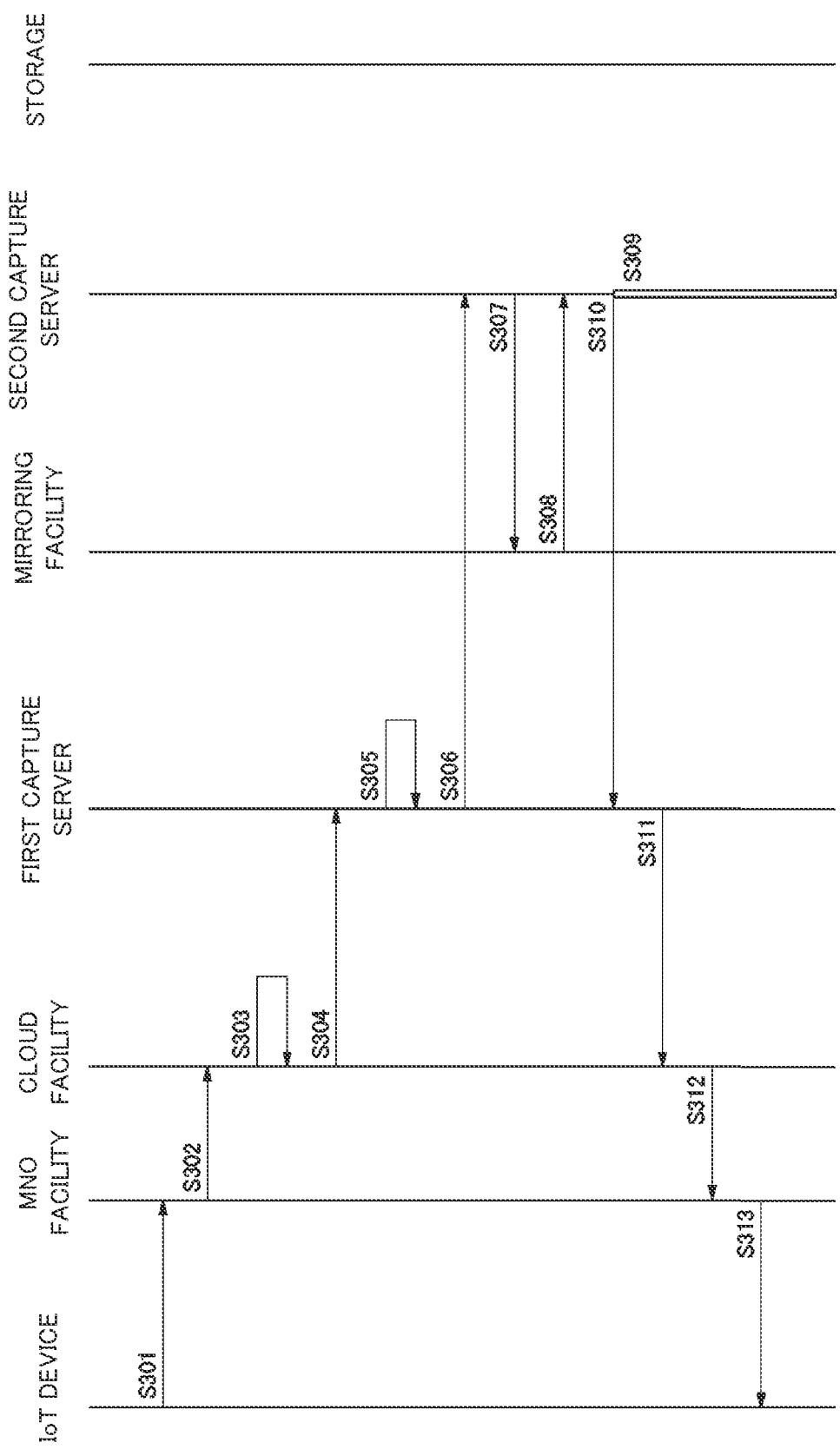
FIG. 3 is a diagram showing a sequence up to establishment of a connection, according to an embodiment of the present invention.
Figure 4:
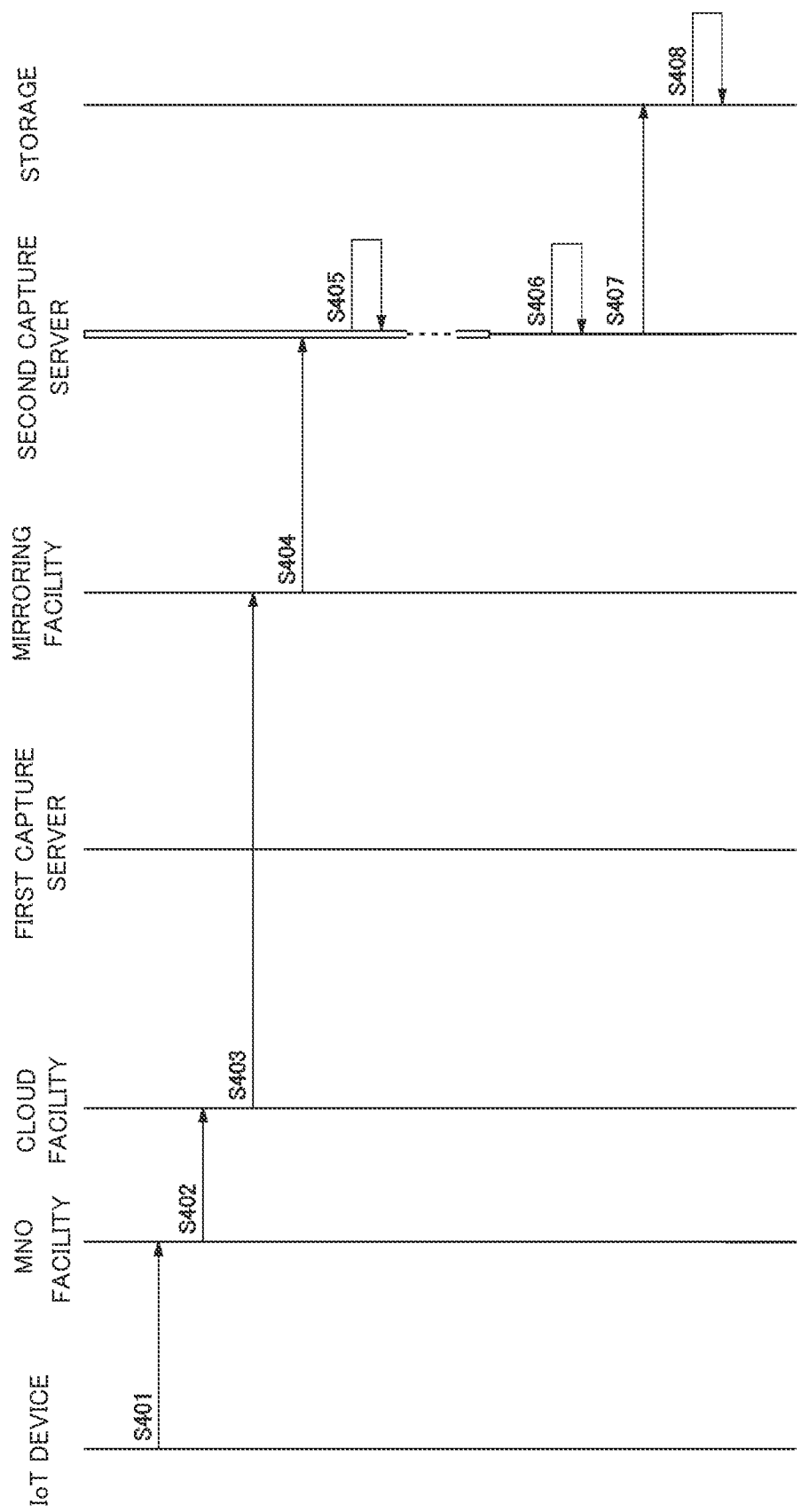
FIG. 4 is a diagram showing a sequence after establishment of the connection, according to an embodiment of the present invention.

FIG. 3 shows a sequence up to establishment of a connection, and FIG. 4 shows the communication after the connection is established. First, the IoT device 130 transmits data to the MNO facility 110 via the base station 120 (S401). In the case of 4G, the MNO facility 110 transmits the data to the cloud facility 101 in a format conforming to the GTP-U protocol (S402), and the cloud facility 101 transmits the data to the external server 140 outside the core network, via the IP network.

The data transmitted from the IoT device 130 to the cloud facility 101 is acquired by the mirroring facility 170 (S403) and transferred to the second capture server 102-2 (S404). The second capture server 102-2 captures, from among the received packets, a packet whose TEID included in the header matches any one of the one or more TEIDs for which the capture process was started (S405). The capture destination may be, for example, the second database 160-2 accessible by the second capture server 102-2. Although FIG. 1 shows the second database 160-2 as a storage device or a storage medium separate from the second capture server 102-2, the second database 160 2 may be a storage device or a storage medium provided in the second capture server 102-2. The second database 160-2 does not necessarily need to be separate from the first database 160-1.

If the MNO facility 110 has received a disconnection request from the IoT device 130 or if the first capture server 102-1 has received a capture stop request, the second capture server 102-2 appropriately stops the capture process. It is preferable that the second capture server 102-2 assigns a flag indicating that the capture process has been stopped, and that the second capture server 102-2 further includes a date and time when the capture process has been stopped, to the association between the one or more session identifiers and the node identifiers of the nodes that started the capture process for the session identifiers, simultaneously with, before, or after the stop of the capture process. That is, a stop flag or a stop date/time is stored in association with the session identifier indicating a session in which the capture process is stopped.

In this way, the second capture server 102-2 can store one or more packets, captured for each session, in a file for each session. Further, the second capture server 102-2 can collectively store a plurality of packets, captured for a plurality of sessions, in a single file (S406). The number of packets in the plurality of packets to be collectively stored in a single file is limited according to the disk capacity in the second capture server 102-2, and when one or more packets exceeding a predetermined data size serving as an upper limit are captured, the capture process can be stopped or the plurality of packets can be collectively stored in another file. Depending on the OS running on the second capture server 102-2, the number of files that can be simultaneously opened has an upper limit of, for example, 1024 files, and a merging process may be performed in multiple stages in order to merge a plurality of files, in which the number of files is equal to or greater than the upper limit, into a single file. For example, in a case where 1024 files is the upper limit, if two-stage processing is performed, 1,048,576 (square of 1024) files can be handled.

Further, the second capture server 102-2 can delete the GTP headers from at least a portion of the plurality of packets when generating a single file including a plurality of packets captured for the plurality of sessions, and can preferably delete the GTP headers from all of the plurality of packets. Since the GTP header including the TEID is data necessary for realizing the capture of a session unit in the communication system 100 and is unnecessary for a user who wishes to acquire the communication content of the IoT device 130, packets divided and captured in a session unit due to the communication technology are merged into a single file and the GTP header which is necessary for capturing packets in a session unit is deleted, thereby making it possible to acquire data in a format that is easy for the user to handle. An example of such a file format is a pcap format.

The second capture server 102-2 stores the captured files as necessary in the storage 180 on the cloud accessible from the second capture server 102-2 (S407). Although the storage 180 is shown as a node separate from the second capture server 102-2 in FIG. 4, in a case where the second capture server 102-2 is an instance on a cloud or a public cloud, the storage 180 may be a component of the second capture server 102-2. It is desirable for the second capture server 102-2 to quickly return to the state in which the next capture process can be started after a capture process is stopped, and it is desirable for the storage 180 to continue holding file data at least until the user downloads the file, and since these components have different life cycles, it is preferable that these components be separate nodes.

If the storage 180 has received a download request for captured data from the user, the storage 180 can generate a download URL (S408) and notify the user of the download URL. Here, the download URL may be generated in advance. Also, upon receiving a download request from the user, the storage 180 may request that the second capture server 102-2 store one or more captured packets in the various file formats described above, and may generate a download URL after receiving the download request.

The download request from the user may be received directly by the storage 180, or may be received indirectly by the storage 180 through input by a user to a website provided by the first capture server 102-1. In the latter case, it is conceivable that the first capture server 102-1 notifies the user about the download URL. Furthermore, in the latter case, the first capture server 102-1 can acquire a plurality of files storing one or more packets for each session from the storage 180, and can generate a single file including a plurality of packets captured for a plurality of sessions as a file for download. The generated file may be downloadable from the first capture server 102-1, or may be stored in the storage 180 and downloadable from the storage 180. Alternatively, an API endpoint or API server (not shown) that provides an API usable by the user can be provided between the first capture server 102-1 and the user terminal, and the user can request the download of captured data by designating a SIM using the API.

Apart from the first capture server 102-1 or the second capture server 102-2, the communication system 100 or the capture server 102 may further comprise an aggregator that acquires a file in which one or more packets are stored for each session from the storage 180, with a predetermined event as a trigger, and generates a single file in which a plurality of packets captured for a plurality of sessions are merged as a single file for download. As an example, the trigger may be that the aggregator has detected that the first capture server 102-1 or the second capture server 102-2 has generated a new file that includes one or more packets for a new session and has stored the new file in the storage 180. Then, a file obtained by merging a plurality of past sessions is acquired from the storage 180, a file to which one or more packets included in the new file have been added is generated again, and this file is stored in the storage 180. In this way, by separating the process of merging a plurality of packets for a plurality of sessions from the first capture server 102-1, which is a node for controlling the start of the capture, or the second capture server 102-2, which is a node for executing the capture, to be a separate node, the computing resources of each node can be effectively used, and each node can be scaled out as necessary if used as an instance on a cloud or a public cloud.

It should be noted that in the present specification, it is assumed that additional information can be considered unless a description of "based on only xx", "in accordance with only xx", "in the case of only xx", or the like is given. As an example, it is to be noted that the description "b in the case of a" does not necessarily mean "b always in the case of a" or "b immediately after a", unless clearly indicated. Further, the phrase "each a constituting A" does not necessarily mean that A is composed of a plurality of components, and includes a case where A is composed of a single component.

Further, for the sake of concern, even if there are aspects of performing operations different from those described in this specification in some methods, programs, terminals, apparatuses, servers or systems (hereinafter, "methods and the like"), each aspect of the present invention is directed to the same operation as any of the operations described in this specification, and it is advised that the presence of operations different from those described in this specification does not depart from the scope of each aspect of the present invention.

What is claimed is:

1. A communication system comprising:
a cloud facility, comprising a system
configured to dynamically provision and provide computing resources to a plurality of tenants,
configured to receive, via a communication facility of a wireless communication network, data transmitted from an Internet of Things (IoT) device and to transmit the data to an IP network,
wherein the computing resources include a processing resource, a memory resource, a storage resource, and a network bandwidth on a network;
a capture server resource configured to capture a portion of the data transmitted from the IoT device toward the cloud facility, wherein the capture server resource comprises one or more capture servers and is configured to:
receive from the cloud facility session identification information for identifying a session associated with a Subscriber Identity Module (SIM) installed in the IoT device that receives a session generation request from the communication facility that received a data communication start request from the IoT device, and
in response
to determine whether or not a capture function is enabled for the SIM associated with the session identification information,
and, responsive to determining the capture function is enabled, to start a capture process for capturing a packet whose session identification information included in a header matches the session identification information associated with the SIM whose the capture function has been enabled, among packets received by mirroring of the data transmitted toward the cloud facility,
wherein the cloud facility is configured to transmit a response to the session generation request to the communication facility connected to the cloud facility, after the capture process is started, and
wherein the capture server resource is further configured to generate a file including a plurality of packets after deleting a general packet radio service tunnelling protocol (GTP) header of each packet, for the plurality of packets captured by the capture process.

2. The communication system according to claim 1, wherein the capture server resource comprises: a first capture server configured to control the start of the capture process; and a second capture server configured to execute capture operations in the capture process.

3. The communication system according to claim 2, wherein the first capture server is further configured to determine whether or not the capture function is enabled based on the session identification information received from the cloud facility.

4. The communication system according to claim 2, wherein the second capture server comprises one or more instances of a node on a cloud, and the second capture server is further configured to selectively cause the one or more instances of the node to execute the capture operation.

5. The communication system according to claim 2, wherein the capture server resource is further configured to store the file in a storage, wherein the storage is in the storage resource on a cloud, or in a storage component of the second capture server, and the file is downloadable by an operator of the IoT device.

6. The communication system according to claim 1, wherein the cloud facility is configured to store an input for enabling a capture function of a SIM managed by a user.

7. The communication system according to claim 2, wherein
the second capture server comprises an instance of a node on a cloud, the second capture server is further configured to store a node identifier in the storage resource identifying the node and corresponding to the session identification information, wherein the storing is associated with the starting of the capture process,
the communication system is further configured to selectively activate, responsive to failure of the instance of the node, a new instance of the node on the cloud,
the second capture server is also further configured to take over the node identifier, after being restarted as the activated new instance of the node due to the failure, and to resume the capture process for at least the session identified by the session identification information corresponding to the node identifier.

8. The communication system according to claim 1, wherein each of the one or more capture servers comprises a respective is one or more instances on a cloud.

9. The communication system according to claim 8, further comprising: a mirroring facility that is configured to perform the mirroring, wherein the mirroring facility comprises one or more instances on the cloud on which the one or more instances of each of the one more capture servers are on.

10. A communication method for capturing a portion of data transmitted from an an Internet of Things (IoT) device via a communication facility of a wireless communication network toward a cloud facility configured to be capable of transmitting the data to an IP network, the communication method comprising: receiving, wherein a capture server resource communicable with the cloud facility receives session identification information for identifying a session associated with a Subscriber Identity Module (SIM) installed in the IoT device from the cloud facility that receives a session generation request from the communication facility that received a data communication start request from the IoT device, and in response determines whether a capture function is enabled for the SIM associated with the session identification information; capturing, wherein, responsive to the capture function being determined as enabled, the capture server resource starts a capture process of capturing a packet whose session identification information included in a header matches the session identification information associated with the SIM in which the capture function has been enabled, among packets received by mirroring of the data transmitted toward the cloud facility; transmitting, wherein the cloud facility transmits a response to the session generation request to the communication facility connected to the cloud facility after the capture process is started; and generating, wherein the capture server resource generates a file including a plurality of packets after deleting a general packet radio service tunnelling protocol (GTP) header of each packet, for the plurality of packets captured by the capture process.

11. A non-transitory storage medium storing a program for causing a cloud facility configured to be capable of transmitting data to an IP network and a capture server capable of communicating with the cloud facility to execute a communication method for capturing a portion of the data transmitted from an Internet of Things (IoT) device via a communication facility of a wireless communication network toward the cloud facility, wherein the communication method comprises:
receiving, wherein the capture server receives from the cloud facility session identification information for identifying a session associated with a Subscriber Identity Module (SIM) installed in the IoT device, corresponding to the cloud facility receiving a session generation request from the communication facility that received a data communication start request from the IoT device, and in response the capture server determines whether a capture function is enabled for the SIM associated with the session identification information;
capturing, wherein the capture server, responsive to determining the capture function is enabled, starts a capture process of capturing a packet whose session identification information included in a header matches the session identification information associated with the SIM in which the capture function has been enabled, among packets received by mirroring of the data transmitted toward the cloud facility;
transmitting, wherein the cloud facility transmits a response to the session generation request to the communication facility connected to the cloud facility after the capture process is started; and
generating, wherein the capture server generates a file including a plurality of packets after deleting a general packet radio service tunnelling protocol (GTP) header of each packet, for the plurality of packets captured by the capture process.

* * * * *